United States Patent
Brown et al.

(10) Patent No.: US 9,664,783 B2
(45) Date of Patent: May 30, 2017

(54) MARINE SONAR DISPLAY DEVICE WITH OPERATING MODE DETERMINATION

(71) Applicant: Garmin Switzerland GmbH, Schaffhausen (CH)

(72) Inventors: Kevin A. Brown, Broken Arrow, OK (US); Aaron R. Coleman, Broken Arrow, OK (US)

(73) Assignee: Garmin Switzerland GmbH (CH)

( * ) Notice: Subject to any disclaimer, the term of this patent is extended or adjusted under 35 U.S.C. 154(b) by 202 days.

(21) Appl. No.: 14/604,242

(22) Filed: Jan. 23, 2015

(65) Prior Publication Data

US 2016/0018516 A1    Jan. 21, 2016

Related U.S. Application Data

(60) Provisional application No. 62/024,833, filed on Jul. 15, 2014, provisional application No. 62/024,843, (Continued)

(51) Int. Cl.
*G01S 7/00* (2006.01)
*G01S 7/526* (2006.01)
(Continued)

(52) U.S. Cl.
CPC .............. *G01S 7/526* (2013.01); *B06B 1/0622* (2013.01); *G01S 7/521* (2013.01); *G01S 7/52003* (2013.01); *G01S 7/60* (2013.01); *G01S 7/6245* (2013.01); *G01S 7/6263* (2013.01); *G01S 7/6272* (2013.01); *G01S 7/6281* (2013.01);
(Continued)

(58) Field of Classification Search
CPC .............................. G01S 7/526; G01S 15/8934
See application file for complete search history.

(56) References Cited

U.S. PATENT DOCUMENTS

| 2,861,320 A | 11/1958 | Gravley | 25/25.35 |
| 3,952,387 A | 4/1976 | Itamura | 29/25.25 |

(Continued)

FOREIGN PATENT DOCUMENTS

WO   WO2009010583   1/2009

OTHER PUBLICATIONS

International Search Report and Written Opinion for corresponding PCT/US2015/030866 dated Jan. 6, 2016.
(Continued)

*Primary Examiner* — Luke Ratcliffe
*Assistant Examiner* — Hovhannes Baghdasaryan
(74) *Attorney, Agent, or Firm* — Samuel M. Korte; Max M. Ali

(57) ABSTRACT

A marine sonar display device comprises a display, a sonar element, a multi axis sensor, a memory element, and a processing element. The display presents sonar images. The sonar element generates a sonar beam. The multi axis sensor determines an orientation and a tilt of the sonar element and present a sensor signal indicating the orientation and the tilt. The processing element is in communication with the display, the sonar element, the multi axis sensor, and the memory element. The processing element further determines an operating mode of the marine sonar display device, wherein the operating mode varying according to the orientation and the tilt of the sonar element.

19 Claims, 9 Drawing Sheets

Related U.S. Application Data filed on Jul. 15, 2014, provisional application No. 62/024,823, filed on Jul. 15, 2014.

(51) Int. Cl.

| | |
|---|---|
| G01S 7/521 | (2006.01) |
| G01S 7/62 | (2006.01) |
| G01S 15/89 | (2006.01) |
| G01S 7/60 | (2006.01) |
| G10K 11/00 | (2006.01) |
| B06B 1/06 | (2006.01) |
| G01S 7/52 | (2006.01) |
| G01S 15/06 | (2006.01) |
| G10K 11/34 | (2006.01) |

(52) U.S. Cl.
CPC .............. *G01S 15/06* (2013.01); *G01S 15/89* (2013.01); *G01S 15/8902* (2013.01); *G10K 11/004* (2013.01); *G10K 11/006* (2013.01); *G10K 11/34* (2013.01)

(56) References Cited

U.S. PATENT DOCUMENTS

| | | | | |
|---|---|---|---|---|
| 4,217,684 | A | 8/1980 | Brisken et al. | 29/25.35 |
| 4,370,785 | A | 2/1983 | Assenza et al. | 29/25.35 |
| 4,385,255 | A | 5/1983 | Yamaguchi et al. | 310/335 |
| 4,404,489 | A | 9/1983 | Larson, III et al. | 310/334 |
| 4,406,967 | A | 9/1983 | Obara et al. | 310/334 |
| 4,411,052 | A | 10/1983 | Kampf | 29/25.35 |
| 4,571,711 | A * | 2/1986 | Chadwick | G01S 7/52003 367/106 |
| 4,683,396 | A | 7/1987 | Takeuchi et al. | 310/358 |
| 4,701,659 | A | 10/1987 | Fujii et al. | 310/334 |
| 4,734,963 | A | 4/1988 | Ishiyama | 29/25.35 |
| 4,747,192 | A | 5/1988 | Rokurota | 29/25.35 |
| 4,773,140 | A | 9/1988 | McAusland | 29/25.35 |
| 4,803,392 | A | 2/1989 | Kushida et al. | 310/311 |
| 5,051,799 | A | 9/1991 | Paul et al. | 375/25 |
| 5,275,167 | A | 1/1994 | Killam | 128/662.03 |
| 5,537,380 | A | 7/1996 | Sprankle, Jr. et al. | 369/291 |
| 5,655,276 | A | 8/1997 | Pattanayak et al. | 29/25.35 |
| 5,730,113 | A | 3/1998 | Wildes et al. | 125/13.01 |
| 5,792,058 | A | 8/1998 | Lee et al. | 600/459 |
| 5,920,523 | A | 7/1999 | Hanafy et al. | 367/140 |
| 5,920,972 | A | 7/1999 | Palczewska et al. | 29/25.35 |
| 5,931,684 | A | 8/1999 | Obendorf et al. | 439/67 |
| 6,043,590 | A | 3/2000 | Gilmore | 310/367 |
| 6,100,626 | A | 8/2000 | Frey et al. | 310/334 |
| 6,110,314 | A | 8/2000 | Nix et al. | 156/218 |
| 6,198,692 | B1 | 3/2001 | Sekine | 367/11 |
| 6,263,551 | B1 | 7/2001 | Lorraine et al. | 29/25.35 |
| 6,445,646 | B1 | 9/2002 | Handa et al. | 367/105 |
| 6,541,896 | B1 | 4/2003 | Piel, Jr. et al. | 310/334 |
| 6,775,388 | B1 | 8/2004 | Pompei | 381/191 |
| 6,894,425 | B1 | 5/2005 | Solomon et al. | 310/334 |
| 7,035,166 | B2 | 4/2006 | Zimmerman et al. | 367/88 |
| 7,123,546 | B2 | 10/2006 | Zimmerman et al. | 367/103 |
| 7,173,879 | B2 | 2/2007 | Zimmerman et al. | 367/103 |
| 7,355,924 | B2 | 4/2008 | Zimmerman et al. | 367/88 |
| 7,508,737 | B1 | 3/2009 | Alexandru | 367/103 |
| 7,846,101 | B2 | 12/2010 | Eberle et al. | 600/459 |
| 8,008,842 | B2 | 8/2011 | Jiang et al. | 310/334 |
| 2002/0126577 | A1* | 9/2002 | Borchardt | G01S 15/87 367/88 |
| 2005/0036404 | A1 | 2/2005 | Zhu et al. | 367/88 |
| 2005/0099887 | A1* | 5/2005 | Zimmerman | G01S 7/52003 367/12 |
| 2007/0070814 | A1 | 3/2007 | Frodyma et al. | 367/134 |
| 2007/0093715 | A1 | 4/2007 | Hippe et al. | 600/437 |
| 2008/0192575 | A1 | 8/2008 | Coleman | 367/115 |
| 2010/0103775 | A1 | 4/2010 | Betts et al. | 345/168 |
| 2011/0202278 | A1 | 8/2011 | Caute et al. | 702/14 |
| 2011/0299630 | A1 | 12/2011 | Petrovic | 375/340 |
| 2013/0107487 | A1 | 5/2013 | Wodnicki et al. | 361/784 |
| 2015/0085602 | A1* | 3/2015 | Lebedev | G01S 7/003 367/3 |

OTHER PUBLICATIONS

International Search Report and Written Opinion for corresponding PCT/US2015/030868 dated Jul. 31, 2015.
International Search Report and Written Opinion for corresponding PCT/US2015/030871 dated Aug. 27, 2015.
SeaBeam Multibeam Operation, published 2000.
Wassp WMB160F Multi-Beam Fishing System Display Modes (published 2007).
How Wassp Works, published 2012.
Wassp Navigator brochure, published 2012.
Wassp 2013 Brochure, published 2013.
U.S. Appl. No. 14/604,266, filed Jan. 23, 2015.
U.S. Appl. No. 14/604,321, filed Jan. 23, 2015.
U.S. Appl. No. 14/604,335, filed Jan. 23, 2015.
U.S. Appl. No. 14/604,347, filed Jan. 23, 2015.

\* cited by examiner

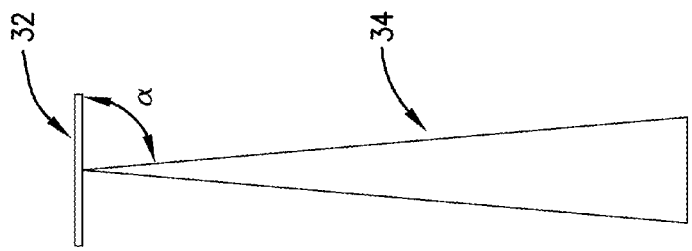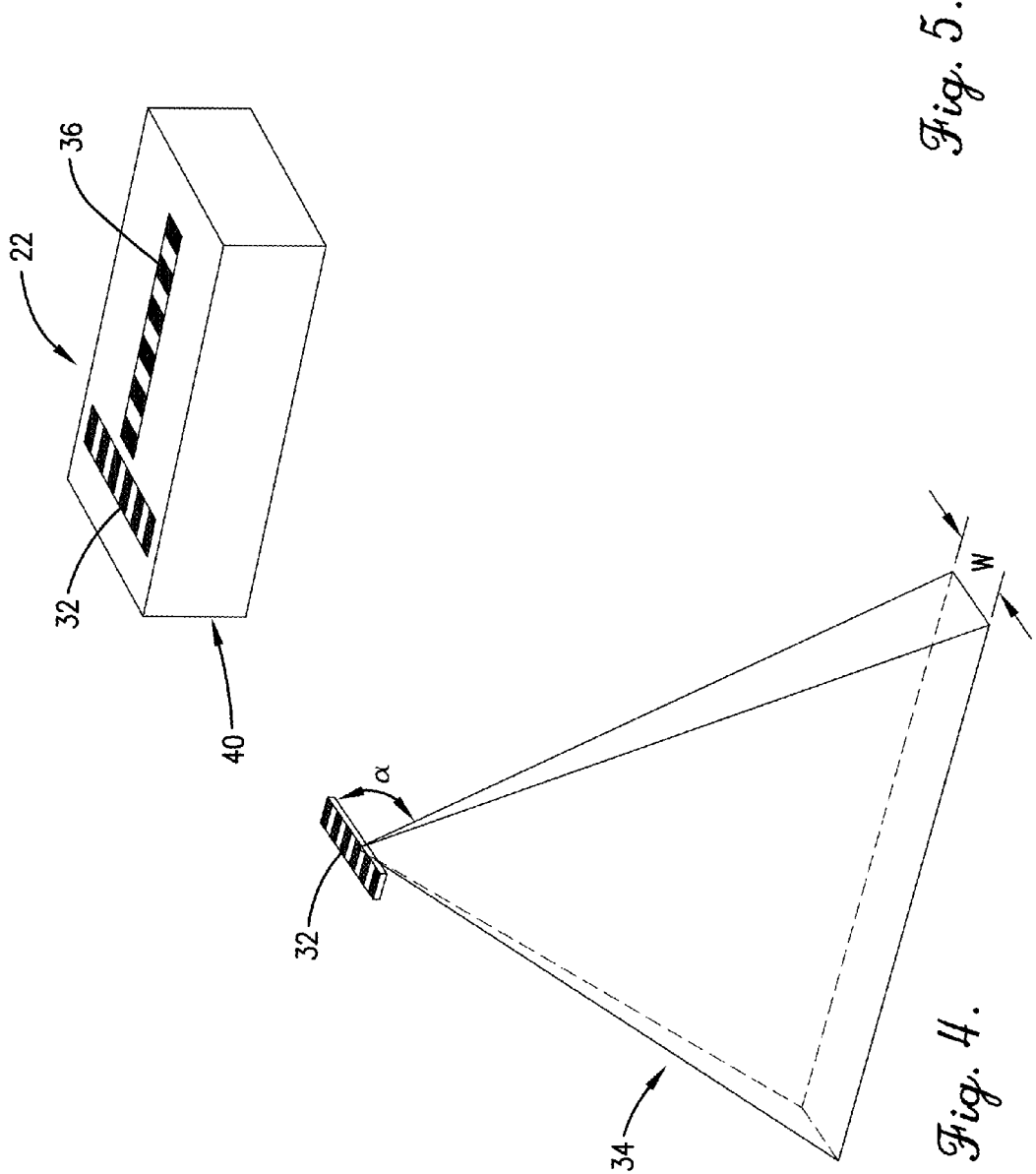

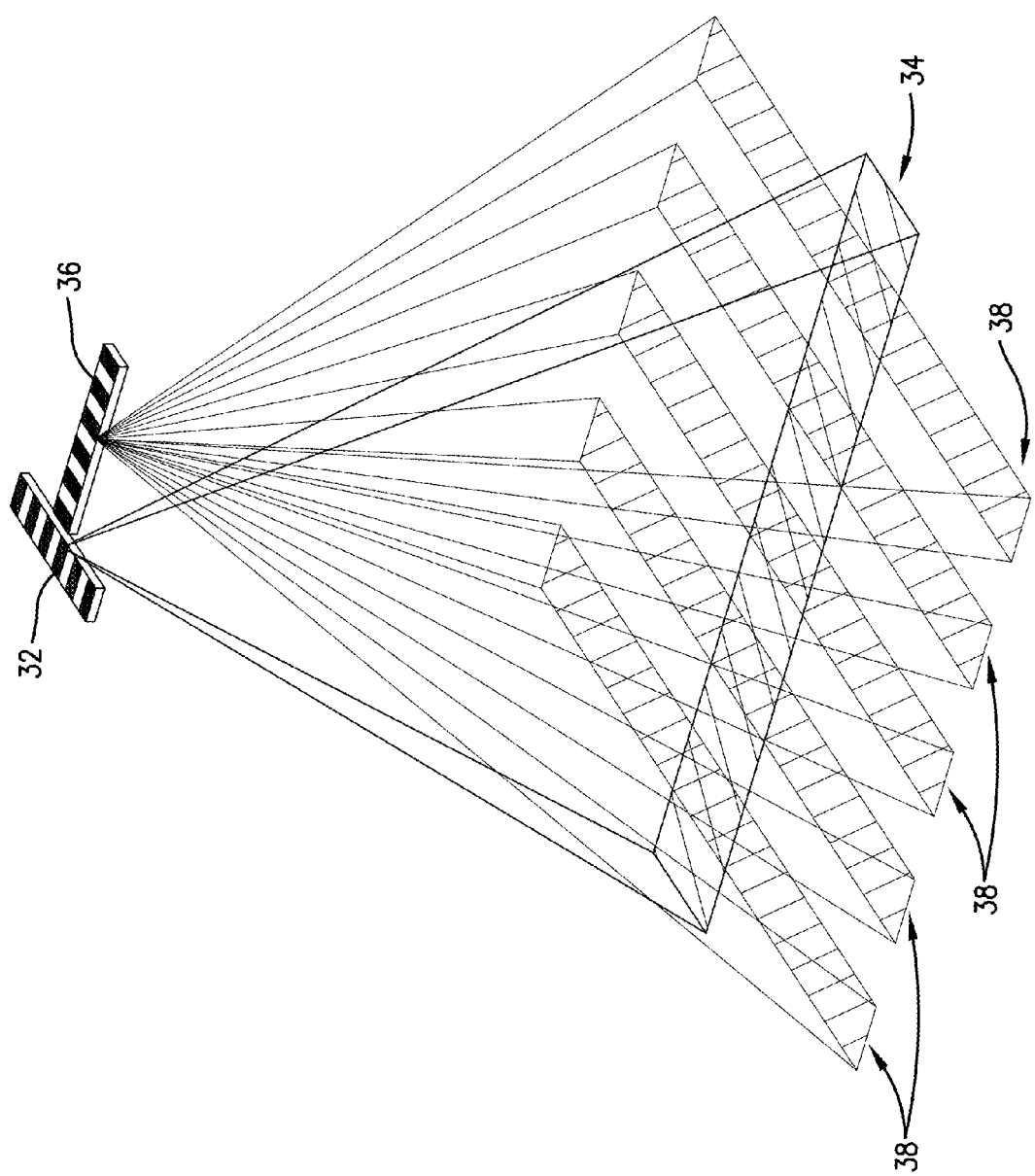

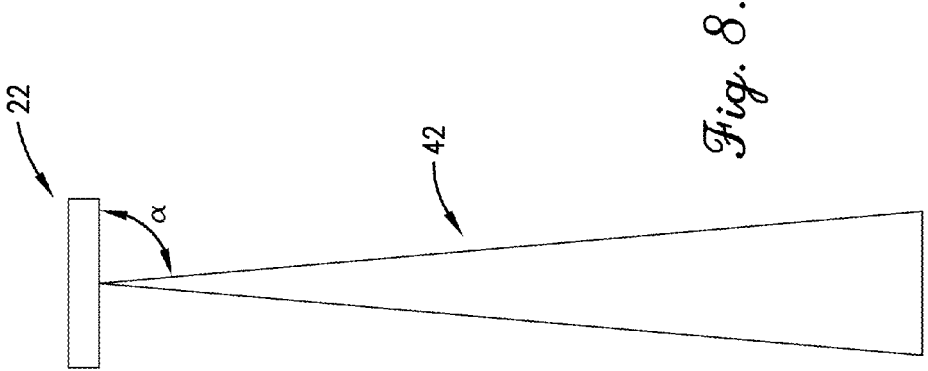
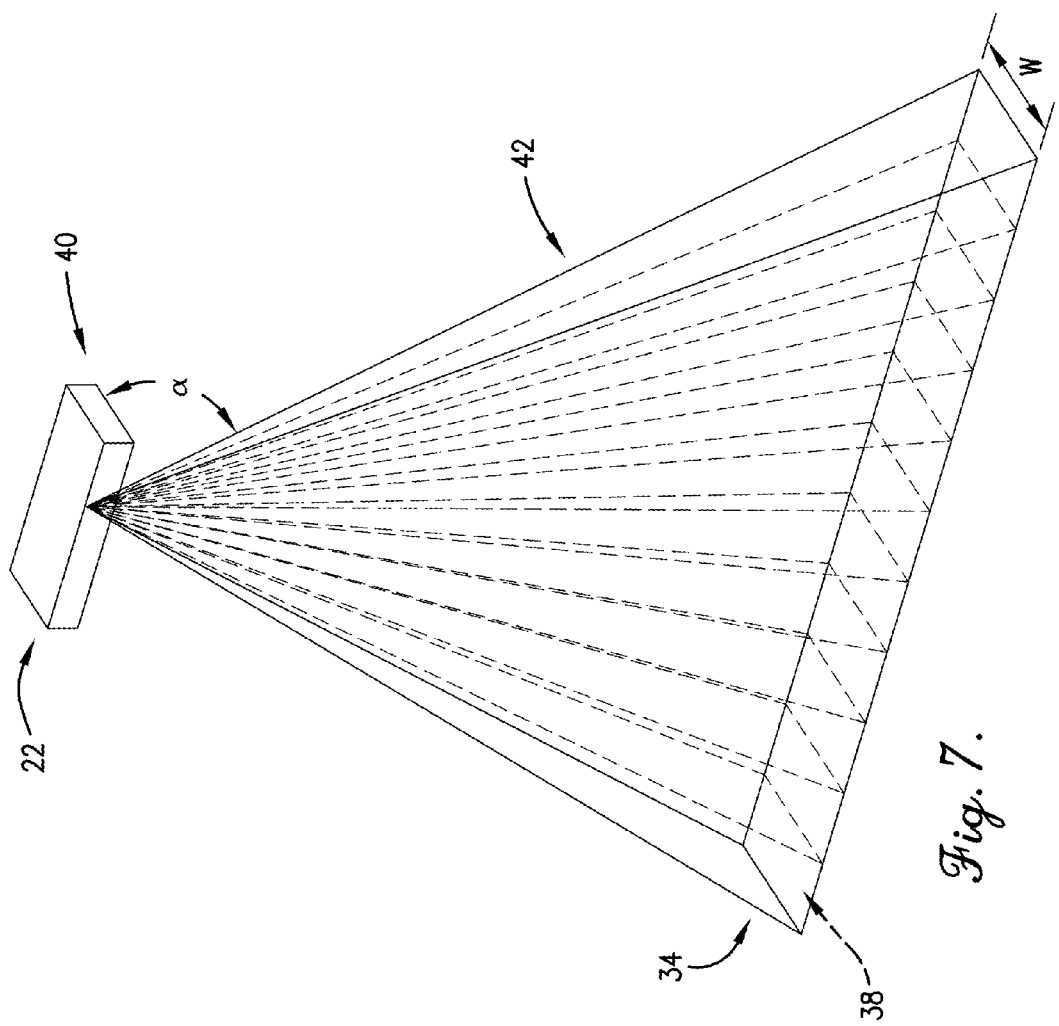

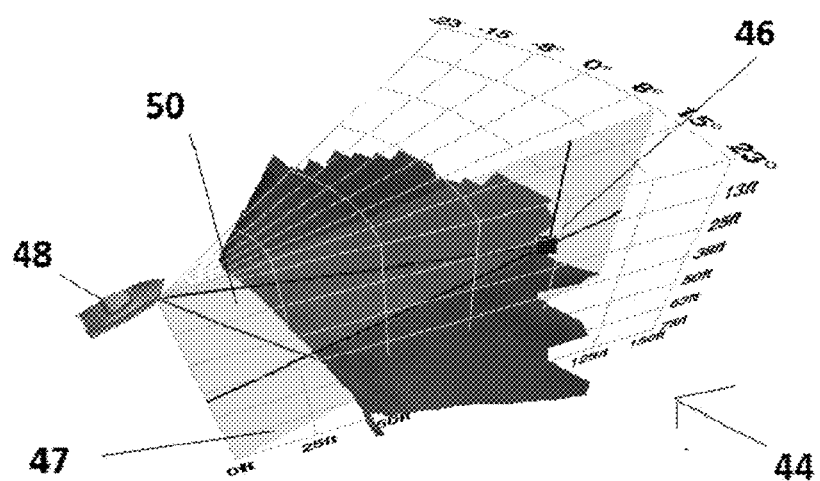
Fig. 15.

MARINE SONAR DISPLAY DEVICE WITH OPERATING MODE DETERMINATION

RELATED APPLICATION

The current non-provisional patent application claims priority benefit, with regard to all common subject matter, of earlier-filed U.S. provisional patent applications entitled "MARINE SONAR DISPLAY DEVICE", Application Ser. No. 62/024,833, filed Jul. 15, 2014; "MARINE MULTI-BEAM SONAR DEVICE," Application Ser. No. 62/024,843, filed Jul. 15, 2014; and "A SONAR TRANSDUCER ARRAY ASSEMBLY AND METHODS OF MANUFACTURE THEREOF", Application Ser. No. 62/024,823, filed Jul. 15, 2014. The earlier-filed applications are hereby incorporated by reference into the current application in their entirety.

BACKGROUND

Marine sound navigation and ranging (sonar) display devices typically include one or more transmit devices to generate a sound beam into a body of water and one or more receive devices to detect the reflections of the sound beam. The sonar display devices may also include a processing element that calculates sonar data based on the reflections to generate a sonar image that is shown on a display. The sonar image typically includes a representation of underwater objects and the water bed in the vicinity of a marine vessel on which the sonar display device is mounted.

SUMMARY

Embodiments of the present technology provide a marine sonar display device that includes a multibeam sonar element which generates a sonar beam whose direction can be controlled. The device may display sonar images derived from sweeping the sonar beam across a range of angles resulting in underwater views that have greater clarity that those of prior art devices. The marine sonar display device comprises a display, a sonar element, a multi axis sensor, a memory element, and a processing element. The display presents sonar images. The sonar element generates a sonar beam. The multi axis sensor determines an orientation and a tilt of the sonar element and present a sensor signal indicating the orientation and the tilt. The processing element is in communication with the display, the sonar element, the multi axis sensor, and the memory element. The processing element further determines an operating mode of the marine sonar display device, wherein the operating mode varying according to the orientation and the tilt of the sonar element.

BRIEF DESCRIPTION OF THE DRAWING FIGURES

Embodiments of the present technology is described in detail below with reference to the attached drawing figures, wherein:

FIG. 3 is a perspective view of a sonar element including a housing, wherein the housing is inverted to display a bottom wall on which a first transducer array and a second transducer array are visible;

FIG. 4 is a perspective view of a transmit beam generated by the first transducer array;

FIG. 5 is a rear view of the transmit beam and the first transducer array;

FIG. 6 is a perspective view of just the first transducer array and the second transducer array from FIG. 3, further illustrating the transmit beam and a plurality of receive beams;

FIG. 7 is a perspective view of the sonar element generating a sonar beam;

FIG. 8 is a rear view of the sonar element and the sonar beam;

FIG. 15 is a screen capture illustrating a 3D forward sweep video view including a cursor plane.

Figure 1:
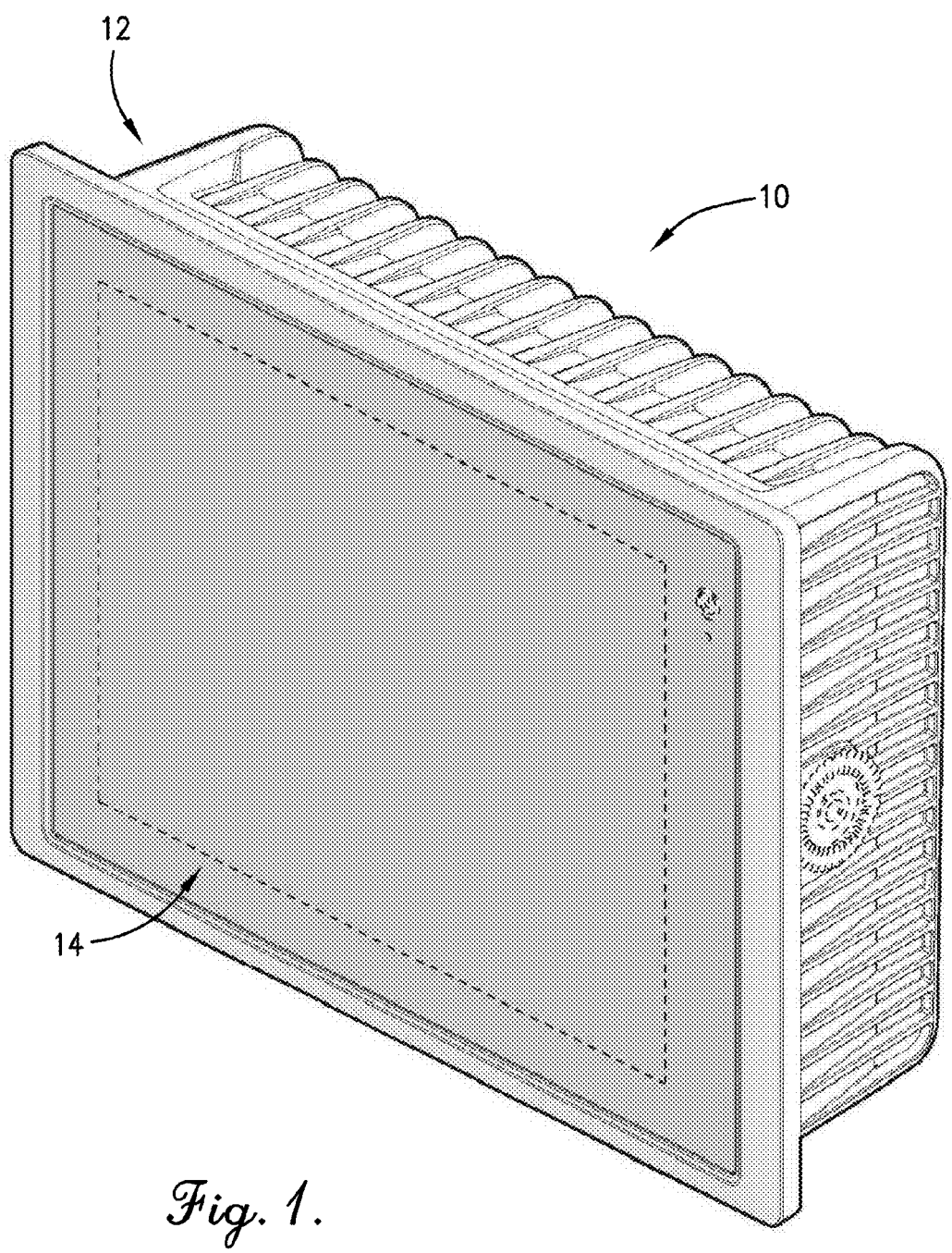
FIG. 1 is a perspective view of a marine sonar display device constructed in accordance with various embodiments of the current technology.

The drawing figures do not limit the present technology to the specific embodiments disclosed and described herein. The drawings are not necessarily to scale, emphasis instead being placed upon clearly illustrating the principles of the technology.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present technology relate to a marine sonar display device that utilizes multibeam technology. Sonar display devices with multibeam technology typically include an array of sound transmitting devices and an array of sound receiving devices that utilize beamforming techniques to generate a broad sonar beam which is projected into a body of water. The sonar display devices may include a processing element that calculates sonar data based on the reflections of the sonar beam from underwater objects and the water bed. The processing element may also generate sonar images corresponding to the sonar data. The sonar images may include representations of underwater objects and the water bed in the vicinity of a marine vessel which is utilizing the sonar display device. However, traditional sonar display devices provide little information from the sonar images other than the above-described representations.

Figure 2:
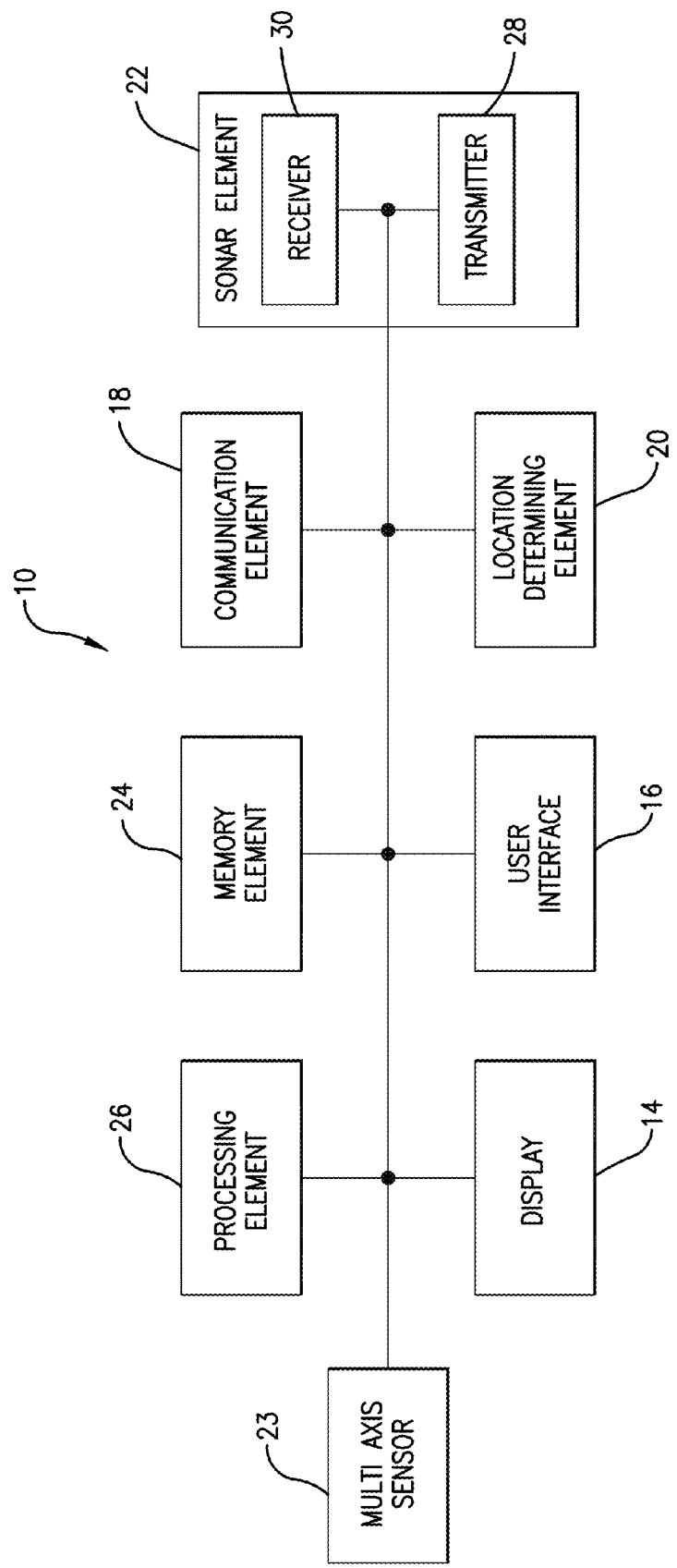
FIG. 2 is block schematic diagram of electronic components of the marine sonar display device.

Embodiments of the technology will now be described in more detail with reference to the drawing figures. Referring initially to FIGS. 1 and 2, a marine sonar display device 10 is illustrated which is configured to display images of underwater objects and the water bed derived from multi-beam sonar. The marine sonar display device 10 broadly comprises a housing 12, a display 14, a user interface 16, a communication element 18, a location determining element 20, a sonar element 22, a multi axis sensor 23, a memory element 24, and a processing element 26.

The marine sonar display device 10 may have one or more modes of operation or usage. A first mode of operation is down scan and side scan in which the device 10 displays two-dimensional (2D) and/or three-dimensional (3D) sonar images from beneath the marine vessel. A second mode of operation is forward scan in which the device 10 displays 2D and 3D sonar images from in front of the marine vessel. Additional or alternative modes may be employed to generate and display sonar images in any configuration or orientation with respect to the marine vessel—e.g., rear, forward, side, down, and/or any other directional orientations.

The housing 12, as shown in FIG. 1, generally encloses and protects the other components, except the sonar element 22, from moisture, vibration, and impact. The housing 12 may include mounting hardware for removably securing the marine sonar display device 10 to a surface within the marine vessel or may be configured to be panel-mounted within the marine vessel. The housing 12 may be constructed from a suitable lightweight and impact-resistant material such as, for example, plastic, nylon, aluminum, or any combination thereof. The housing 12 may include one or more appropriate gaskets or seals to make it substantially waterproof or resistant. The housing 12 may take any suitable shape or size, and the particular size, weight and configuration of the housing 12 may be changed without departing from the scope of the present technology.

The display 14, as shown in FIG. 1, may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), or the like, or combinations thereof. The display 14 may possess a square or a rectangular aspect ratio and may be viewed in either a landscape or a portrait mode. In various embodiments, the display 14 may also include a touch screen occupying the entire screen or a portion thereof so that the display 14 functions as part of the user interface 16. The touch screen may allow the user to interact with the marine sonar display device 10 by physically touching, swiping, or gesturing on areas of the screen.

The user interface 16 generally allows the user to utilize inputs and outputs to interact with the marine sonar display device 10. Inputs may include buttons, pushbuttons, knobs, jog dials, shuttle dials, directional pads, multidirectional buttons, switches, keypads, keyboards, mice, joysticks, microphones, or the like, or combinations thereof. Outputs may include audio speakers, lights, dials, meters, or the like, or combinations thereof. With the user interface 16, the user may be able to control the features and operation of the display 14. For example, the user may be able to zoom in and out on the display 14 using either virtual onscreen buttons or actual pushbuttons. In addition, the user may be able to pan the image on the display 14 either by touching and swiping the screen of the display 14 or by using multidirectional buttons or dials.

The communication element 18 generally allows communication with external systems or devices. The communication element 18 may include signal or data transmitting and receiving circuits, such as antennas, amplifiers, filters, mixers, oscillators, digital signal processors (DSPs), and the like. The communication element 18 may establish communication wirelessly by utilizing radio frequency (RF) signals and/or data that comply with communication standards such as cellular 2G, 3G, or 4G, Institute of Electrical and Electronics Engineers (IEEE) 802.11 standard such as WiFi, IEEE 802.16 standard such as WiMAX, Bluetooth™, or combinations thereof. In addition, the communication element 18 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 18 may establish communication through connectors or couplers that receive metal conductor wires or cables or optical fiber cables. The communication element 18 may be in communication with the processing element 26 and the memory element 24.

The location determining element 20 generally determines a current geolocation of the marine sonar display device 10 and may receive and process radio frequency (RF) signals from a global navigation satellite system (GNSS) such as the global positioning system (GPS) primarily used in the United States, the GLONASS system primarily used in the Soviet Union, or the Galileo system primarily used in Europe. The location determining element 20 may accompany or include an antenna to assist in receiving the satellite signals. The antenna may be a patch antenna, a linear antenna, or any other type of antenna that can be used with location or navigation devices. The location determining element 20 may include satellite navigation receivers, processors, controllers, other computing devices, or combinations thereof, and memory. The location determining element 20 may process a signal, referred to herein as a "location signal", from one or more satellites that includes data from which geographic information such as the current geolocation is derived. The current geolocation may include coordinates, such as the latitude and longitude, of the current location of the marine sonar display device 10. The location determining element 20 may communicate the current geolocation to the processing element 26, the memory element 24, or both.

Although embodiments of the location determining element 20 may include a satellite navigation receiver, it will be appreciated that other location-determining technology may be used. For example, cellular towers or any customized transmitting radio frequency towers can be used instead of satellites may be used to determine the location of the marine sonar display device 10 by receiving data from at least three transmitting locations and then performing basic triangulation calculations to determine the relative position of the device with respect to the transmitting locations. With such a configuration, any standard geometric triangulation algorithm can be used to determine the location of the marine sonar display device 10. The location determining element 20 may also include or be coupled with a pedometer, accelerometer, compass, or other dead-reckoning components which allow it to determine the location of the device 10. The location determining element 20 may determine the current geographic location through a communications network, such as by using Assisted GPS (A-GPS), or from another electronic device. The location determining element 20 may even receive location data directly from a user.

The sonar element 22, as shown in FIG. 3, generally includes multibeam, phased-array sound navigation and ranging (sonar) components. In various embodiments, the sonar element 22 may include a transmitter 28, a receiver 30, a first transducer array 32, and a second transducer array 36. The transmitter 28 may include electronic circuitry which connects to either the first transducer array 32 or the second transducer array 36. The electronic circuitry may include components such as amplifiers, filters, and transformers that process a transmit transducer electronic signal. The transmit electronic signal may include a plurality of individual transmit transducer electronic signals, wherein each transmit transducer electronic signal is a series of periodic pulses, such as sine wave pulses or square wave pulses, whose phase can be adjusted. A single series of pulses may be referred to as a "ping". The transmit transducer electronic signals may be communicated to either the first transducer array 32 or the second transducer array 36, one of which will generate a corresponding transmit beam 34, seen in FIGS. 4-6, that is reflected off of underwater objects and the water bed, as discussed in more detail below. The first transducer array 32 is shown in the figures as generating the transmit beam 34. This implementation is merely exemplary, and the transmit beam 34 may be generated by the second transducer array 36 as well.

The receiver 30 may include electronic circuitry which connects to either the first transducer array 32 or the second transducer array 36. The electronic circuitry may include components such as amplifiers, filters, and analog to digital converters (ADCs) that process a receive transducer electronic signal. The receive transducer electronic signals may be generated by either the first transducer array 32 or the second transducer array 36 as a result of the reflections of the transmit beam 34 from the objects or the water bed in the path of the transmit beam 34. Each receive transducer electronic signal includes, or is associated with, a phase or time delay which may be adjusted. These phase values may be utilized by the processing element 26 when sonar data is calculated, as described in more detail below. A particular set of phase values may determine the reflections that are received at a particular angle with respect to either the first transducer array 32 or the second transducer array 36. The combination of particular phase values and the receive transducer electronic signals may be considered a receive beam 38, as seen in FIG. 6. The receive beam 38 is shown in the figures as being associated with the second transducer array 36. This implementation is merely exemplary, and the transmit beam 34 may be generated by the first transducer array 32 as well. Varying the phase values also varies the angle of the receive beam 38, with one set of phase values for each angle desired. The receive beam 38 may have a roughly triangular profile with a long, narrow base representing a swath where the beam reflects from the water bed. Furthermore, the receive beam 38 may be oriented such that its longitudinal axis is orthogonal to the axis formed by either the first transducer array 32 or the second transducer array 36.

The first transducer array 32 generally includes a plurality of transducers or transducer elements that are positioned to form a two-dimensional linear array. Each transducer may be formed from piezoelectric materials like ceramics such as lead zirconate titanate (PZT) or polymers such as polyvinylidene difluoride (PVDF). The first transducer array 32 may be configured or programmed, by the processing element 26, to perform a beam transmitting function, a beam receiving function, or both, wherein the beam includes an acoustic wave at sonic or ultrasonic frequencies.

When the first transducer array 32 is functioning as a beam transmitter, each transducer of the array 32 may receive a transmit transducer electronic signal and may produce a series of mechanical vibrations or oscillations that forms a corresponding acoustic beam. The acoustic beam may have a positive acoustic pressure or a negative acoustic pressure depending on the polarity of the transmit transducer electronic signal. Generally, the acoustic beam may have a positive acoustic pressure corresponding to a positive polarity of the transmit transducer electronic signal, while a negative electrical polarity may result in an acoustic beam with negative acoustic pressure.

The transducers in the first transducer array 32 may be spaced apart with the pitch from one transducer to the next determined by a wavelength, or inversely, the frequency, of the transmit beam 34. Given the close proximity of the transducers to one another in the first transducer array 32, when each transducer produces an acoustic beam, constructive and destructive wave interference may occur, creating a pattern of nodes and antinodes that can be shaped to form the transmit beam 34, which functions as a single acoustic beam that can be steered or directed. However, in certain embodiments, the arrays 32, 36 may employ any transducer configuration including non-phased, steerable, and non-steerable, sonar elements.

The transmit beam 34 may have a roughly triangular profile with a long, narrow base representing a swath where the beam impacts the water bed. The transmit beam 34 may be oriented such that its longitudinal axis is orthogonal to the axis formed by the first transducer array 32. The direction of the transmit beam 34, or its angle $\alpha$ with respect to the array axis as seen in FIGS. 4 and 5, may be controlled by controlling the phase of each sound beam, which in turn may be controlled by the transmit transducer electronic signals. Thus, by properly adjusting the phase of each transmit transducer electronic signal, the direction of the transmit beam 34 may be varied. If the phases are adjusted on successive pings of the transmit transducer electronic signals, then the transmit beam 34 may be swept through a range of angles. When the transmitter 28 is utilized with a marine vessel and the transmit beam 34 is swept, the beam may be swept from front to back of the vessel or from side to side, depending on the orientation of the first transducer array 32. In addition, the width of the transmit beam 34, as shown in FIG. 4, may be controlled by adjusting the phase of each transmit transducer electronic signal.

When the first transducer array 32 is functioning as a beam receiver, each transducer of the array 32 may receive acoustic pressure from an acoustic beam, such as one reflected from underwater objects and the water bed, and may generate a receive transducer electronic signal corresponding to the acoustic beam. Furthermore, the receive transducer electronic signal may have a positive polarity (e.g., a positive voltage) corresponding to a positive acoustic pressure and a negative polarity (e.g., a negative voltage) corresponding to a negative acoustic pressure. The receive electronic signal from each transducer of the array 32 is communicated to the receiver 30, which performs processing on the signals as discussed above and communicates them to the processing element 26, which calculates sonar data from the signals.

When the first transducer array 32 is functioning as both a beam transmitter and a beam receiver, a portion of the transducers of the array 32 transmit an acoustic beam while the rest of the transducers receive the acoustic beam. Typically, the transducers transmitting the beam are grouped together toward one end of the array 32, while the transducers receiving the beam are grouped together toward the opposing end.

The second transducer array 36 may be substantially the same in structure and operation as the first transducer array 32. That is, the second transducer array 36 may function as either a beam transmitter, a beam receiver, or both. In some embodiments, the second transducer array 36 may include the same number of transducers as the first transducer array 32. In other embodiments, the second transducer array 36 may have a greater or lesser number of transducers than the first transducer array 32.

The function of each transducer array 32, 36 may be controlled by the processing element 26, which controls the connections between the first transducer array 32, the second transducer array 36, the transmitter 28, and the receiver 30. When the first transducer array 32 is connected to the transmitter 28, it functions as a beam transmitter. When the first transducer 32 is connected to the receiver 30, it functions as a beam receiver. When the first transducer array 32 is connected to the transmitter 28 and the receiver 30, it functions as both a beam transmitter and a beam receiver. Likewise, with the second transducer array 36. The sonar element 22 may include switching circuits, multiplexing circuits, demultiplexing circuits, or combinations thereof that control the connections between the two arrays 32, 36, the transmitter 28, and the receiver 30. These circuits may receive signals or data from the processing element 26 that establish the appropriate connections.

The first transducer array 32 may be oriented with its linear axis orthogonal to the linear axis of the second transducer array 36 to form what is commonly known as a "Mills Cross". In various embodiments, the second transducer array 36 may be positioned such that one end of the second transducer array 36 is adjacent to the center of the first transducer array 32, as seen in FIGS. 3 and 6. Having the first transducer array 32 oriented orthogonally with the second transducer array 36 allows the receive beam 38 to be swept across the path of the transmit beam 34 in order to determine the angular direction of the water bed features or other objects that reflect the transmit beam 34.

The sonar element 22 may further include a housing 40, as seen in FIGS. 3 and 7, that encloses the transmitter 28 and the receiver 30. The housing 40 may include a top wall, a bottom wall, and four sidewalls. The first transducer array 32 and the second transducer array 36 may be positioned in an opening on the bottom wall, as seen in FIG. 3, wherein the bottom wall is face up.

The sonar element 22 is typically mounted to a hull of the marine vessel, but may be mounted anywhere which provides access to a body of water. Thus, in configurations, the sonar element 22 may be configured for towing behind the marine vessel, for use with a remote operated vehicle (ROV) or autonomous vehicle associated with the marine vessel, and/or for extension from the hull of the marine vessel via mounting brackets, transom and trolling mounts, and the like. The specific position and orientation of the sonar element 22 may depend on the mode of operation of the marine sonar display device 10. In the down scan and side scan mode of operation, the sonar element 22 may be mounted to the hull of the marine vessel such that the first transducer array 32 and the second transducer array 36 lie in a horizontal plane with the first transducer array 32 extending between the forward and rear ends of the marine vessel and the second transducer array 36 extending between the port and starboard sides of the marine vessel. In the forward scan mode of operation, the sonar element 22 may be mounted to the hull of the marine vessel such that the first transducer array 32 and the second transducer array 36 lie in a plane that is tilted with any depression angle. In some configurations, the depression angle may be approximately 30-60 degrees and in some embodiments 45 degrees with respect to the horizontal. In addition, the first transducer array 32 may extend between the port and starboard sides of the marine vessel and the second transducer array 36 may extend between the forward and rear ends of the marine vessel. In some embodiments, the sonar element 22 may include one or more mechanisms, such as servo motors, that will tilt and rotate the first transducer array 32 and the second transducer array 36 in order to switch between modes of operation. The housing 40 of the sonar element 22 may be configured for mounting in a plurality of configurations to support any mode of operation.

Referring to FIG. 6, the sonar element 22 may operate as follows, wherein the first transducer array 32 is configured to operate as a beam transmitter and the second transducer array 36 is configured to operate as a beam receiver. The transmitter 28 may receive the transmit transducer electronic signals from the processing element 26 and, in turn, the first transducer array 32 may generate a ping or a short burst of pings along the transmit beam 34 path (whose angle and width are determined by controlling the phase of the transmit transducer electronic signal to each transducer of the first transducer array 32). The second transducer array 36 may receive the reflections of the transmit beam 34 and each transducer of the second transducer array 36 may generate a receive transducer electronic signal. The receive transducer electronic signals may be communicated to the processing element 26, which performs a series of calculations on the data included in the signals. The calculations may determine how the receive beams 38 are formed to receive the transmit beam 34 reflections. The combination of the single transmit beam 34 and the multiple receive beams 38 may form a sonar beam 42 where the transmit beam 34 and the receive beams 38 overlap. Thus, each sonar beam 42 may be thought of as emanating from a single point and formed from a single transmit beam 34 and a plurality of receive beams 38, as seen in FIG. 7, wherein the number of receive beams 38 may depend on the resolution of the sonar beam 42 that is desired. Generally, the higher the number of receive beams 38, the greater the resolution. Furthermore, the sonar beam 42 may be projected at the same angle α, as seen in FIGS. 7 and 8, with respect to the plane of the first transducer array 32 and the second transducer array 36 as the transmit beam 34. In addition, since the sonar beam 42 is formed from the transmit beam 34, the width of the sonar beam 42, as shown in FIG. 7, may be controlled by adjusting the phase of each transmit transducer electronic signal.

The multi axis sensor 23 generally determines orientation information regarding the sonar element 22 and may include sensing device such as accelerometers, gyroscopes, magnetometers, and the like. The multi axis sensor 23 may be enclosed in the housing 40 and may provide information about the sonar element 22 such as 3-axis motion or acceleration, 3-axis orientation, compass readings, and the like.

The multi axis sensor 23 may be able to determine a tilt of the sonar element 22 and thus, may be able to determine whether the housing 40 and the two arrays 32, 36 are on a horizontal plane or whether they are tilted forward. The multi axis sensor 23 may further be able to determine a rotational or angular orientation of the sonar element 22 and thus, may be able to determine which of either the first transducer array 32 or the second transducer array 36 is aligned with the longitudinal axis of the marine vessel. The information may be included in a sensor signal that is communicated from the multi axis sensor 23 to the processing element 26.

The memory element 24 may include data storage components such as read-only memory (ROM), programmable ROM, erasable programmable ROM, random-access memory (RAM) such as static RAM (SRAM) or dynamic RAM (DRAM), hard disks, floppy disks, optical disks, flash memory, thumb drives, universal serial bus (USB) drives, or the like, or combinations thereof. The memory element 24 may include, or may constitute, a "computer-readable medium". The memory element 24 may store the instructions, code, code segments, software, firmware, programs, applications, apps, services, daemons, or the like that are executed by the processing element 26. The memory element 24 may also store settings, data, documents, sound files, photographs, movies, images, databases, and the like.

The processing element 26 may include processors, microprocessors, microcontrollers, digital signal processors (DSPs), field-programmable gate arrays (FPGAs), analog and/or digital application-specific integrated circuits (ASICs), or the like, or combinations thereof. The processing element 26 may generally execute, process, or run instructions, code, code segments, software, firmware, programs, applications, apps, processes, services, daemons, or the like, or may step through states of a finite-state machine, or combinations of these actions. The processing element 26 may be in communication with the other electronic components through serial or parallel links that include address busses, data busses, control lines, and the like.

The processing element 26 may be configured to control the operation of the sonar element 22. The processing element 26 may assign the functions (beam transmitter, beam receiver, or both) to the first transducer array 32 and the second transducer array 36. The assignment may be based on the orientation of the housing 40 of the sonar element 22, as provided by the multi axis sensor 23, or input from the user regarding video view options. The processing element 26 may also adjust the phase of all of the transmit transducer electronic signals and may communicate them to the transmitter 28. The phase adjustment may determine the width and the angle α of the transmit beam 34. The angle α may vary according to settings of the marine sonar display device 10. With some settings, the angle α may be set to approximately 90 degrees and held there so that the sonar beam 42 aims straight down. Or, the angle α may be set and held at another value. With other settings, the angle α may initially be set to its smallest value and then incrementally increased, or swept, to its maximum value.

The first transducer array 32 or the second transducer array 36 may generate the transmit beam 34 as a ping or burst of pings as discussed above. As the transmit beam 34 returns from the water bed and underwater objects in the path of the beam, the transducer array 32, 36 configured to receive the beam 34 may generate the receive transducer electronic signals. The processing element 26 may receive the receive transducer electronic signals and may perform a series of calculations on the data included in the signals to determine the features of the water bed or objects in the path of the transmit beam 34. The processing element 26 may set the phase value for each receive transducer electronic signal to calculate sonar data for the receive beam 38 being positioned at a first angle. Typically, the first angle is set for the receive beam 38 to point at one edge of the transmit beam 34 swath. The processing element 26 may also adjust the phase value for each receive transducer electronic signal to calculate sonar data for the receive beam 38 being positioned at a plurality of incrementally increasing angles, wherein the last angle corresponds to the opposite edge of the transmit beam 34 swath. The calculation of sonar data for the multiple receive beams 38 is also the calculation of sonar data for the sonar beam 42.

In some embodiments, the calculations of the sonar data for the sonar beam 42 may be performed as a set of simultaneous equations or a matrix equation. Furthermore, calculations such as a fast Fourier transform (FFT) may be performed to compute the sonar data. The time delay from when the ping was generated until the reflections were received may determine the depth of objects in the transmit beam 34 path or the water bed. The amplitude, intensity, or other characteristic of the sonar data may determine the density of the objects in the transmit beam 34 path or the water bed. After the calculations are performed, or in some embodiments, as the calculations are being performed, the processing element 26 may communicate transmit transducer electronic signals to the transmitter 28 to generate another ping. The angle α of the sonar beam 42 may be the same as for the previous ping, or it may be adjusted to a different angle, depending on settings of the marine sonar display device 10.

The processing element 26 may be configured to generate sonar imagery based on the sonar data. The sonar imagery may be communicated to the display 14 and may generally include representations of the underwater objects and the water bed derived from the sonar data that are in the path of the sonar beam 42. The specifics of the sonar imagery may depend on the operating mode of the marine sonar display device 10 and a user-selected video view, as discussed below.

The processing element 26 may receive data from the multi axis sensor 23 regarding the orientation and the tilt of the sonar element 22. From this data, the processing element 26 may automatically determine whether the marine sonar display device 10 is in the down scan and side scan mode or in the forward scan mode. The processing element 26 may also prepare the content of various menus to be shown on the display 14 based on the information from the multi axis sensor 23. The menus may include options for selecting what type of sonar scan is performed or what type of video view is available.

The processing element 26 may receive geolocation or positional information from the location determining element 20. In various embodiments, the processing element 26 may associate the sonar data with geolocation information. The processing element 26 may create a database or a database-like structure, that is stored in the memory element 24, in which a portion of the geolocations in the vicinity of the marine vessel are associated with a depth and a density.

The various components of the marine sonar display device 10 may be integrated into one or more housings as discussed above. For instance, the sonar element 22 may be supported or encapsulated by housing 40 while the display 14, user interface 16, location determining component 20, communication element 18, sensor 23, memory element 24, and processing element 26 may be supported by housing 12.

However, any number of housings may be employed to retain the various components of the marine sonar display device 10. For instance, a first housing may house the display 14 and user interface 16, a second housing may house the processing element 26, and a third housing may house the sonar element 22. Such configurations enable embodiments of the present technology to be employed with a variety of hardware and marine equipment. For example, in one embodiment, a conventional smart phone may function as the display 14.

The marine sonar display device 10 may function as follows. In some embodiments, the sonar element 22 may be mounted on the hull of the marine vessel according to the mode of operation of the marine sonar display device 10. In the down scan and side scan mode of operation, the sonar element 22 may be mounted to the hull of the marine vessel such that the first transducer array 32 and the second transducer array 36 lie in a horizontal plane. In the forward scan mode of operation, the sonar element 22 may be mounted to the hull of the marine vessel such that the first transducer array 32 and the second transducer array 36 lie in a plane that is tilted to an angle approximately 30 degrees to approximately 60 degrees with respect to the horizontal. The sonar element 22 may have to be manually or automatically remounted or adjusted if the mode of operation is changed. In other embodiments, the sonar element 22 may include one or more mechanisms, such as servo motors, that tilt and rotate the first transducer array 32 and the second transducer array 36 in order to switch between modes of operation. In certain embodiments, the sonar element 22 may only need to be tilted, either manually or mechanically, to switch between the modes of operation. And, in some configurations, the sonar element 22 may be associated with a remote operated vehicle (ROV), underwater submersible, and/or autonomous underwater vehicle (AUV) where the orientation of the sonar element 22 with respect to the marine vessel's hull may be varied independent of any mounting to the marine vessel.

Once the marine sonar display device 10 is installed and operational, the multi axis sensor 23 may determine the orientation and the tilt of the sonar element 22. The processing element 26 may receive this information and determine the operating mode of the marine sonar display device 10. Based on the operating mode, the processing element 26 may prepare video view options and menu selections that are shown on the display 14. For example, when the marine sonar display device 10 is operating in the down scan and side scan mode, the video view options from which a user can select may include a 2D down view, a 3D down view, and a 3D down sweep view. In the forward scan mode, the video view options may include a 2D forward view, a 2D forward split view, and a 3D forward sweep view. These video view options may be presented on one or more menus that appear on the display 14. If the user interface 16 includes a touchscreen, then the user can select the options on the display 14. In addition, or instead, the user interface 16 may include buttons, keys, or similar objects that allow the user to select video view options. Furthermore, the processing element 26 may prepare the information that is shown on the display 14 to accompany the sonar images for each of the video views described below. However, the device 10 may provide any combination of operating modes (e.g., orientations and configurations of the sonar element 22) and view options (2D, 3D, down, top, rear, forward, side, 360, etc.)

Based on the operating mode or input from the user in selecting video view options, the processing element 26 may assign functionality to the first transducer array 32 and the second transducer array 36. Typically, in the side and down scan mode, the transducer array (either the first transducer array 32 or the second transducer array 36) that is positioned with its longitudinal axis in alignment with, or parallel to, the longitudinal axis of the marine vessel is assigned to transmit the sonar beam 42 while the other transducer array is assigned to receive the sonar beam 42. In the forward scan mode, the assignments are reversed. In some situations, such as when one transducer array includes more transducer elements than the other array, it may be advantageous to change the traditional assignment of functions to the transducer arrays. Furthermore, in some situations, it may be advantageous to have one transducer array perform both the transmit and receive functions.

Figure 9:
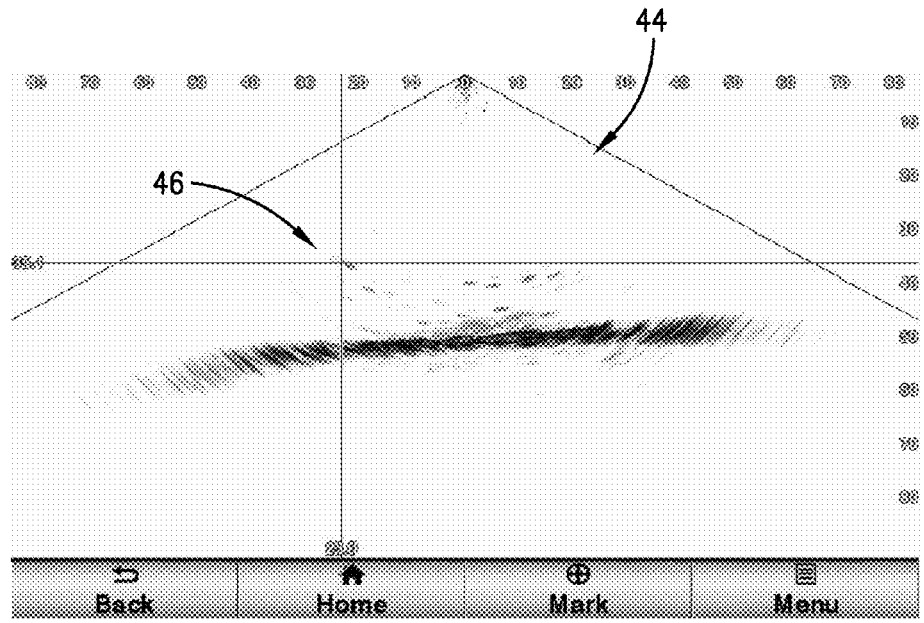
FIG. 9 is a screen capture from a display of the marine sonar display device illustrating a two-dimensional (2D) down video view.

In the 2D down view, seen in FIG. 9, the processing element 26 may instruct the sonar element 22 to repeatedly generate the sonar beam 42 at the angle $\alpha$ of approximately 90 degrees such that the sonar beam 42 is pointed straight down beneath the marine vessel. The processing element 26 may receive the receive transducer electronic signals, calculate the sonar data, and generate sonar imagery, which is communicated to the display 14. The display 14 may show a sonar image 44 with representations of the underwater objects and the water bed that are in the path of the sonar beam 42. The display 14 may also show a representation of the sonar beam 42 overlaid on the sonar image 44, wherein the representation includes two sides of the triangular shape of the sonar beam 42. The representations of the sonar beam 42, the underwater objects, and the water bed may be presented as an elevational view from the rear of the marine vessel. The processing element 26 may assign a color to the underwater objects and the water bed based on the density indicated by the sonar data. The display 14 may further show an indication of a distance from the center of the marine vessel (or the location where the sonar element is mounted) to the port side and to the starboard side. In addition, the display 14 may show an indication of the depth below the marine vessel. The distance indication is typically shown at the top of the display 14 screen, while the depth indication is typically shown on one side the display 14 screen.

The location of the underwater objects as they are shown on the display 14 screen generally represents their position in the water relative to the marine vessel, such that underwater objects on the port side of the vessel appear on the left side of the display 14 and underwater objects on the starboard side of the vessel appear on the right side of the display 14. Furthermore, the portion of the sonar image 44 showing the underwater objects and the water bed may be redrawn on the display 14 after the sonar data for each ping is calculated, resulting in a near real time or "live" presentation of the sonar image 44.

In the 2D down view, the user may also be able to place a cursor 46 on the display 14 that overlays the sonar image 44. The cursor 46 may include crosshairs for a particular point on the sonar image 44. The display 14 may further show one or more scales that provide an indication of the depth and the distance from the center of the marine vessel pointed to by the crosshairs. The user may be able to move the crosshairs by clicking and dragging a mouse, selecting or depressing a keypad or button, and/or by touching or making gestures on the display 14.

Figure 10:
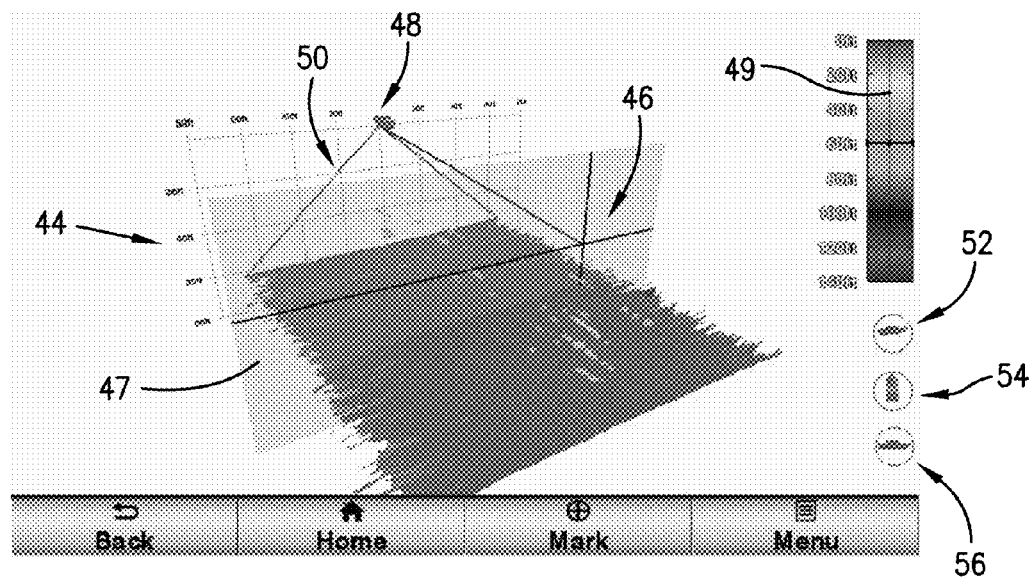
FIG. 10 is a screen capture illustrating a three-dimensional (3D) down video view including a cursor plane.

In the 3D down view, seen in FIG. 10, the processing element 26 may instruct the sonar element 22 to repeatedly generate the sonar beam 42 at the angle $\alpha$ of approximately 90 degrees such that the sonar beam 42 is pointed straight down beneath the marine vessel, as occurs in the 2D down view. From the calculated sonar data, the processing element 26 may generate a three-dimensional view 45 that includes the sonar image 44 with representations of the underwater objects and the water bed that are in the path of the sonar beam 42 that is shown on the display 14. The sonar image 44 may further include additional sonar images 44, derived from historical sonar data, with representations of the underwater objects and the water bed that were in the path of the sonar beam 42 detected from previous pings. The display 14 may also show a marine vessel icon 48 and a sonar beam icon 50 overlaid on the three-dimensional view 45. The marine vessel icon 48 may include a representation of a boat. The sonar beam icon 50 includes a triangle appearing directly beneath the marine vessel, wherein an apex of the triangle originates from a position on the hull where the sonar element 22 would be mounted. In addition, the bottom side of the triangle takes on the cross-sectional shape of the water bed along the plane of the sonar beam 42. The representations of the underwater objects and water bed derived from historical sonar data are shown extending rearward from the sonar beam icon 50 with the most recently detected underwater objects and water bed appearing closest to the sonar beam icon 50 and earlier detected underwater objects and water bed appearing farther away from the sonar beam icon 50. The three-dimensional view 45 may include sonar images 44 from a limited number of previous pings. Those sonar images 44 derived from pings that are beyond the limit may, in some configurations, not be redrawn on the display 14.

The sonar images 44, the marine vessel icon 48, and the sonar beam icon 50 of the 3D down view may be presented in a perspective view, wherein the perspective may be selected by the user using the user interface 16, such as by clicking and dragging a mouse or making gestures on the display 14 if it includes a touchscreen. The display 14 may further include one or more scales that provide an indication of a distance from the center of the marine vessel to the port side and to the starboard side as well as an indication of the depth below the marine vessel. In addition, the processing element 26 may assign a color to the underwater objects based on their depth, wherein the color is chosen from a first color palette 49. The first color palette 49 may be on the display 14 in proximity to the three-dimensional view 45 along with an indication of how the colors correspond to the water depth. In some embodiments, the water bed may be assigned a color based on its depth from the first color palette 49. In other embodiments, the water bed may be assigned a color from a second color palette.

For instance, in the example of FIG. 10, the water bed may be colored green while objects above the water bed may be colored based on their respective depth below the water's surface. In other implementations, the water bed and objects suspended above the water bed may both be colored according to the one or more depth-based color palettes. In one configuration, the color palette spreads the red-orange-yellow-green-blue-indigo-violet spectrum across about 140 feet so that objects nearest the vessel (within about 10 feet for instance) are colored red, objects between about 10-25 feet are colored orange, objects between about 25-35 feet are colored yellow, and so forth. The particular color palette(s) employed by the device 10 may be user configurable to enable the user to select desired colors based on depth and/or object type.

Furthermore, the display 14 may include icons, such as buttons, that allow the user to select views of the three-dimensional view 45 from various predetermined perspectives. In exemplary embodiments, the display 14 may include three viewing icons. A first icon 52 may select a perspective view. A second icon 54 may select an overhead plan view. A third icon 56 may select a side elevational view. Upon selection of any of the icons 52, 54, 56, the display 14 may smoothly switch to the desired view of the three-dimensional view 45. Such functionally enables the user to operate the user interface 16 to view any visual representation of sonar data (e.g., from any angle, attitude, and/or orientation) while the icons 52, 54, 56 allow the user to rapidly return to primary views without manually repositioning the displayed data. In some implementations, one or more of the view icons may be user programmable via the user interface 16 to enable the user to save desired sonar view perspectives for later recall and access.

As shown in the example of FIGS. 10 and 15, the user may also be able to place the cursor 46 on the display 14. The cursor 46 may include crosshairs for a particular point on one of the sonar images 44. The display 14 may further show a cursor plane 47 that is parallel to the plane of the sonar beam 42. The cursor plane 47 may highlight or indicate underwater objects that were detected from a particular ping of the sonar beam 42. The user may be able to select the time indicated by the cursor plane 47 by clicking and dragging the cursor plane with a mouse, keypad, and/or button or making gestures on the display 14 if it includes a touchscreen, e.g., the user may slide and/or drag his or her fingers across the display 14 to position the cursor plane 47 at a desired point in time (e.g., over current or previously-received sonar data). The cursor 46, and its associated crosshairs, may be placed on the cursor plane 47 through the user interface 16. The user may be able to move the crosshairs by clicking and dragging the crosshairs. In configurations using a touchscreen, the user may be able to move the cursor 46 and its crosshairs by tapping. Thus, in touchscreen configurations, the cursor 46 and cursor plane 47 may be easily positioned to select sonar data by the user sliding, dragging, and tapping his or her fingers.

Data selected using the cursor 46 may be employed for various purposes. In one configuration, selection of sonar data with the cursor 46 creates a geographic waypoint indicating, for example, the latitude and longitude of the selected sonar data point. The geographic location of the selected sonar data point may be determined utilizing historical location data generated by the location determining component 20 and/or stored sonar data within the memory 24. The historical location data may include a track log or database indicating previous geographic locations of the marine vessel. The stored sonar data may include scan information, such as scan angle and phase information, for previous sonar returns. Such waypoint marking functionality, for example, may be useful to enable the user to later return to the geographic location corresponding to the selected sonar data point, to provide distance, bearing, and navigational information relative to the geographic location of the selected sonar data point, to view the selected sonar data point from different orientations, angles, and attitudes using various 2D and 3D views, combinations thereof, and the like.

The cursor 46 and associated cursor plane 47 may be employed with any sonar views presented by the device 10. Thus, for example, in any view, the user may function the user interface 16 to move the cursor plane 47 forward and backwards in time while moving the cursor 46, within the plane 47, to select or overlay sonar data corresponding to the time selected by the cursor plane 47. In some views, such as side scan views, the device 10 may present two or more synchronized cursors 46 and cursor planes 47 to allow selection of sonar data across time.

Figure 11:
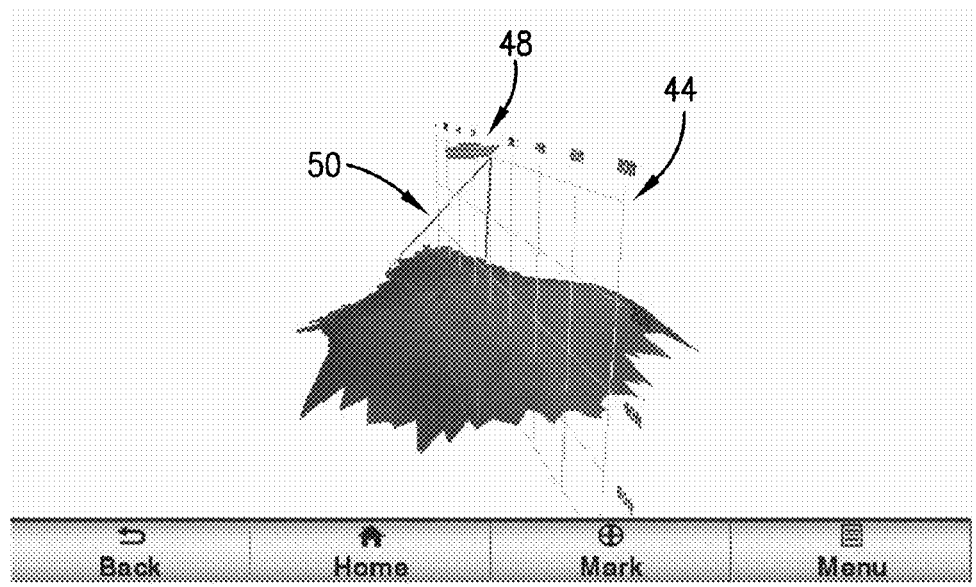
FIG. 11 is a screen capture illustrating a 3D down sweep video view.

In the 3D down sweep view, as seen in FIG. 11, the processing element 26 may instruct the sonar element 22 to sweep the range of angles α for the sonar beam 42, typically such that the sonar beam 42 is pointed downward and swept along a line between the front of the marine vessel and the rear of the marine vessel. In exemplary embodiments, the sonar beam 42 is swept from the front to the rear of the marine vessel. From the calculated sonar data, the processing element 26 may generate the three-dimensional view 45 that includes the sonar images 44 resulting from sweeping the sonar beam 42. The sonar images 44 may include representations of the underwater objects and the water bed that are in the path of the sonar beam 42 as it is being swept. Each sonar image 44 may be configured to appear on the display 14 at the same angle α as the associated sonar beam 42 was generated. The sonar images 44 for each angle α of the sonar beam 42 may be from the most recent pings and are replaced as soon as the sonar data for each ping is available. The display 14 may also show the marine vessel icon 48 and the sonar beam icon 50 overlaid on the three-dimensional view 45. As with the 3D down view, the three-dimensional view 45 in the 3D down sweep view is presented as a perspective view, wherein the perspective may be selected by the user, such as by clicking and dragging a mouse or making gestures on the display 14 if it includes a touchscreen. The 3D down sweep view includes other features of the 3D down view such as the distance and depth scales, coloring of underwater objects and the water bed from one or more color palettes, and icons that allow the user to select different perspectives of the three-dimensional view 45.

Figure 12:
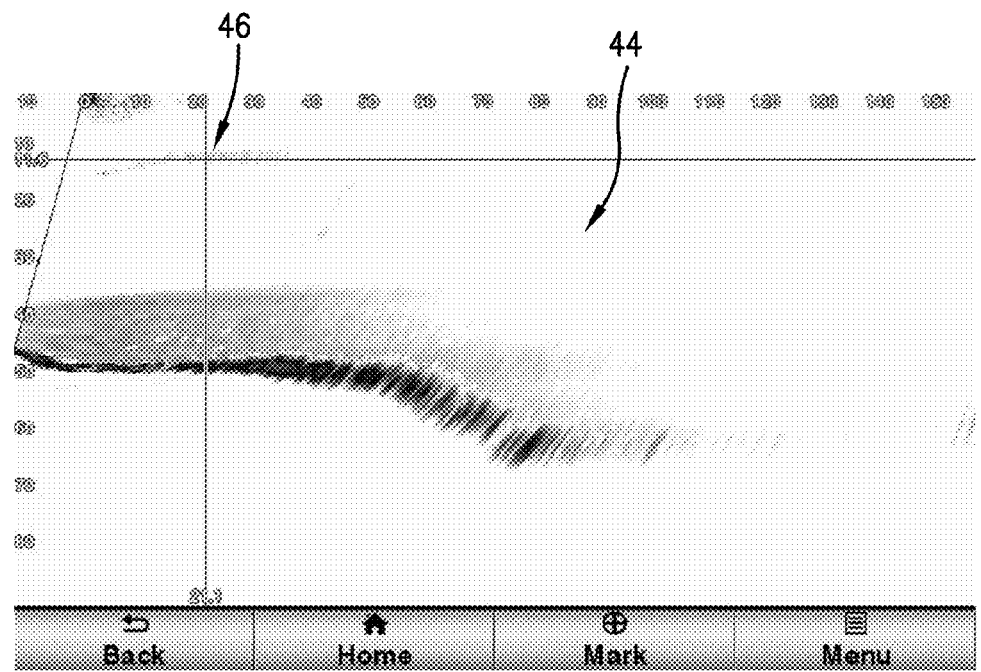
FIG. 12 is a screen capture illustrating a 2D forward video view.

The 2D forward view, as seen in FIG. 12, is similar to the 2D down view. The processing element 26 may instruct the sonar element 22 to repeatedly generate the sonar beam 42 at the angle α of approximately 90 degrees. But since the first transducer array 32 and the second transducer array 36 are rotated by 90 degrees and tilted forward, as compared with the 2D down view, the sonar beam 42 is projected on a longitudinal path in front of the marine vessel instead of a side-to-side path below the marine vessel. As a result, the sonar image 44 generated by the processing element 26 may include representations of the underwater objects and the water bed that are on a path extending from the front (bow) of the marine vessel forward. The display 14 may also show a representation of the rear edge of the sonar beam 42 overlaid on the sonar image 44.

The representations of the sonar beam 42, the underwater objects, and the water bed may be presented as an elevational view from the side, typically from the starboard side looking to the port side, of the marine vessel. The underwater objects and the water bed may be assigned a color based on the density indicated by the sonar data. The display 14 may further show a first scale providing an indication of a distance from the front of the marine vessel as well as a second scale providing an indication of the depth below the marine vessel. The distance scale is typically shown at the top of the display 14 screen, while the depth scale is typically shown on one side the display 14 screen. In the 2D forward view as shown in FIG. 12, underwater objects that appear on the left side of the display 14 are closer to the front of the marine vessel while objects on the right side of the display 14 are farther from the marine vessel.

As described above, the user may also be able to place the cursor 46 and/or cursor plane 47 on the display 14. The cursor 46 may include crosshairs for a particular point on the sonar image 44. The display 14 may further show an indication of the depth and the distance from the front of the marine vessel pointed to by the crosshairs. The user may be able to move the cursor 46 and cursor plane 47 using the user interface 16.

Figure 13:
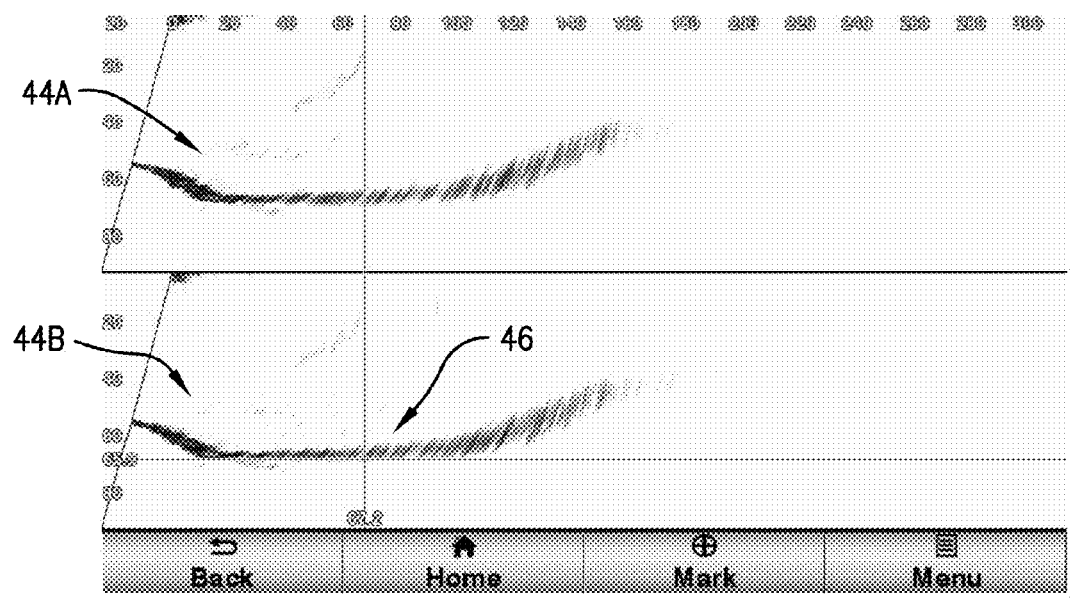
FIG. 13 is a screen capture illustrating a 2D forward split video view.

In the 2D forward split view, seen in FIG. 13, the processing element 26 may instruct the sonar element 22 to generate a first sonar beam 42 that is pointed to the starboard side of the marine vessel and a second sonar beam 42 that is pointed to the port side of the marine vessel. The sonar element 22 may generate the first sonar beam 42 on odd-numbered pings and the second sonar beam 42 on even-numbered pings. Thus, the processing element 26 may calculate two sets of sonar data and may generate two sonar images 44 to be shown on the display 14. A first sonar image 44A, with representations of the underwater objects and the water bed derived from the sonar data of the first sonar beam 42, may be shown on the upper half of the display 14. A second sonar image 44B, with representations of the underwater objects and the water bed derived from the sonar data of the second sonar beam 42, may be shown on the lower half of the display 14. The display 14 may also show representations of the rear edges of the sonar beams 42 overlaid on the sonar images 44.

The first sonar image 44A and the second sonar image 44B may be presented as elevational views from the side, typically the starboard side, of the marine vessel. The 2D forward split view may further include features of the 2D forward view, such as coloring based on density data and scales indicating forward distance and depth. In the 2D forward split view as shown in FIG. 13, underwater objects that appear on the left side of the display 14 for both sonar images 44A, 44B are closer to the front of the marine vessel while objects on the right side of the display 14 are farther from the marine vessel.

The user may also be able to place the cursor 46 and/or cursor plane 47 that overlays the either the first sonar image 44A or the second sonar image 44B on the display 14. The cursor 46 may include crosshairs for a particular point on one of the sonar images 44A, 44B. The display 14 may further show an indication of the depth and the distance from the front of the marine vessel pointed to by the crosshairs. The user may be able to move the cursor 46 and cursor plane 47 using the user interface 16.

Figure 14:
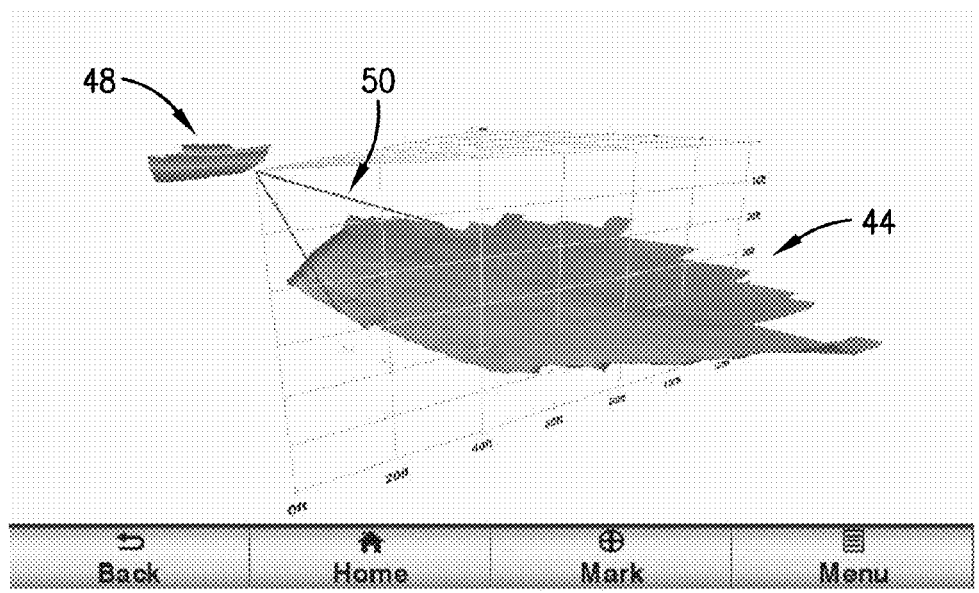
FIG. 14 is a screen capture illustrating a 3D forward sweep video view.

The 3D forward sweep view, as seen in FIG. 14, is similar to the 3D down sweep view. The processing element 26 may instruct the sonar element 22 to sweep the range of angles α for the sonar beam 42. But, since the first transducer array 32 and the second transducer array 36 are rotated by 90 degrees and tilted forward, the sonar beam 42 may be pointed in a forward direction to one side of the marine vessel, such as starboard. The sonar beam 42 is then swept in the forward direction to the other side of the marine vessel, such as port, although sweeping could be performed in the opposite direction as well. From the calculated sonar data, the processing element 26 may generate the three-dimensional view 45 that includes the sonar images 44 resulting from sweeping the sonar beam 42. Further similar to the 3D forward sweep view, the sonar images 44 may include representations of the underwater objects and the water bed that are in the path of the sonar beam 42 as it is being swept. Each sonar image 44 may be configured to appear on the display 14 at the same angle α as the associated sonar beam 42 was generated. The sonar images 44 for each angle α of the sonar beam 42 may be from the most recent pings and are replaced as soon as the sonar data for each ping is available. The display 14 may also show the marine vessel icon 48 and the sonar beam icon 50 overlaid on the three-dimensional view 45. As with some other views, the three-dimensional view 45 in the 3D forward sweep view is presented as a perspective view, wherein the perspective may be selected by the user, such as by clicking and dragging a mouse or making gestures on the display 14 if it includes a touchscreen. The 3D forward sweep view may include other features such as the distance and depth scales, coloring of underwater objects and the water bed from one or more color palettes, and icons that allow the user to select different perspectives of the three-dimensional view 45.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

What is claimed is:

1. A marine sonar display device comprising:
a display configured to display sonar images;
a sonar element configured to generate a sonar beam;
a multi axis sensor configured to determine an orientation and a tilt of the sonar element and generate a sensor signal indicating the orientation and the tilt;
a memory element; and
a processing element in communication with the display, the sonar element, the multi axis sensor, and the memory element, the processing element configured to—
receive the sensor signal, and
determine an operating mode of the marine sonar display device, the operating mode varying according to the orientation and the tilt of the sonar element;
wherein the processing element is further configured to determine whether the marine sonar display device is operating in a side and down scan mode or a forward scan mode based on the orientation and the tilt of the sonar element.

2. The marine sonar display device of claim 1, wherein the sonar element includes a transmit transducer array and a receive transducer array arranged in a Mills cross configuration and the multi axis sensor is configured to determine the orientation of the transmit transducer array and the receive transducer array.

3. The marine sonar display device of claim 2, wherein the sonar element is configured to be mounted on a marine vessel and the multi axis sensor is configured to determine the orientation of the transmit transducer array and the receive transducer array with respect to a longitudinal axis of the marine vessel.

4. A marine sonar display device comprising:
a display configured to display sonar images;
a sonar element configured to generate a sonar beam and present transducer signals;
a multi axis sensor configured to determine an orientation and a tilt of the sonar element and generate a sensor signal indicating the orientation and the tilt;
a memory element; and
a processing element in communication with the display, the sonar element, the multi axis sensor, and the memory element, the processing element configured to—
receive the sensor signal,
determine whether the marine sonar display device is in a side and down scan mode or a forward scan mode based on the orientation and the tilt of the sonar element,
determine a plurality of user-selectable video view options, the video view options varying according to the determined mode of the marine sonar display device, and
control the display to present video view options based on the determined mode.

5. The marine sonar display device of claim 4, wherein the sonar element includes a transmit transducer array and a receive transducer array arranged in a Mills cross configuration and the multi axis sensor is configured to determine the orientation of the transmit transducer array and the receive transducer array.

6. The marine sonar display device of claim 5, wherein the sonar element is mounted on a marine vessel and the multi axis sensor is configured to determine the orientation of the transmit transducer array and the receive transducer array with respect to a longitudinal axis of the marine vessel.

7. The marine sonar display device of claim 4, wherein the video view options include a two-dimensional down view, a three-dimensional down view, and a three-dimensional down sweep view that are available in the side and down scan mode and a two-dimensional forward view, a two-dimensional forward split view, and a three-dimensional forward sweep view that are available in the forward scan mode.

8. The marine sonar display device of claim 4, wherein the sonar element is further configured to present transducer signals and the processing element is further configured to
receive the transducer signals,
calculate sonar data from the transducer signals,
generate a sonar image from the sonar data,
determine whether the sonar image is to be displayed in either a side and down scan mode or a forward scan mode based on the orientation and the tilt of the sonar element, and
control the display to visually present the sonar image in the determined mode.

9. The marine sonar display device of claim 8, wherein the processing element is further configured to generate at least one distance scale to accompany the sonar image, the at least one distance scale indicating a distance to the left side and the right side of the sonar element in the side and down scan mode and a distance in front of the sonar element in the forward scan mode.

10. A marine sonar display device comprising:
a display configured to display sonar images;
a sonar element configured to generate a sonar beam and present transducer signals;
a multi axis sensor configured to determine an orientation and a tilt of the sonar element and present a sensor signal indicating the orientation and the tilt;
a memory element; and
a processing element in communication with the display, the sonar element, the multi axis sensor, and the memory element, the processing element configured to—
receive the sensor signal,
determine whether the marine sonar display device is in a side and down scan mode or a forward scan mode based on the orientation and the tilt of the sonar element,
determine a plurality of video view options that are available to be displayed, the video view options including one or more of a two-dimensional down view, a three-dimensional down view, a three-dimensional down sweep view a two-dimensional forward view, a two-dimensional forward split view, and a three-dimensional forward sweep view, and control the display to present video view options based on the determined mode.

11. The marine sonar display device of claim 10, wherein the sonar element includes a transmit transducer array and a receive transducer array arranged in a Mills cross configuration and the multi axis sensor is configured to determine the orientation of the transmit transducer array and the receive transducer array.

12. The marine sonar display device of claim 11, wherein the sonar element is mounted on a marine vessel and the multi axis sensor is configured to determine the orientation of the transmit transducer array and the receive transducer array with respect to a longitudinal axis of the marine vessel.

13. The marine sonar display device of claim 10, wherein the sonar element is further configured to present transducer signals and the processing element is further configured to receive the transducer signals, calculate sonar data from the transducer signals, generate a sonar image from the sonar data, determine whether the sonar image is to be displayed in a side and down scan mode or a forward scan mode based on the orientation and the tilt of the sonar element, and control the display to visually present the sonar image in the determined mode.

14. The marine sonar display device of claim 13, wherein the processing element is further configured to generate at least one distance scale to accompany the sonar image, the at least one distance scale indicating a distance to the left side and the right side of the sonar element in the side and down scan mode and a distance in front of the sonar element in the forward scan mode.

15. A marine sonar display device comprising:

a display configured to display sonar images;

a sonar element configured to generate a sonar beam;

a multi axis sensor configured to determine an orientation and a tilt of the sonar element and generate a sensor signal indicating the orientation and the tilt;

a memory element; and a processing element in communication with the display, the sonar element, the multi axis sensor, and the memory element, the processing element configured to— receive the sensor signal, and determine an operating mode of the marine sonar display device, the operating mode varying according to the orientation and the tilt of the sonar element;

wherein the sonar element is further configured to present transducer signals and the processing element is further configured to— receive the transducer signals, calculate sonar data from the transducer signals, generate a sonar image from the sonar data, determine whether the sonar image is to be displayed in either a side and down scan mode or a forward scan mode based on the orientation and the tilt of the sonar element, and control the display to visually present the sonar image in the determined mode.

16. The marine sonar display device of claim 15, wherein the processing element is further configured to generate at least one distance scale to accompany the sonar image, the at least one distance scale indicating a distance to the left side and the right side of the sonar element in the side and down scan mode and a distance in front of the sonar element in the forward scan mode.

17. A marine sonar display device comprising:

a display configured to display sonar images;

a sonar element configured to generate a sonar beam;

a multi axis sensor configured to determine an orientation and a tilt of the sonar element and generate a sensor signal indicating the orientation and the tilt;

a memory element; and a processing element in communication with the display, the sonar element, the multi axis sensor, and the memory element, the processing element configured to— receive the sensor signal, and determine an operating mode of the marine sonar display device, the operating mode varying according to the orientation and the tilt of the sonar element;

wherein the processing element is further configured to determine a plurality of user-selectable video view options, the video view options varying according to the operating mode of the marine sonar display device.

18. The marine sonar display device of claim 17, wherein the video view options include a two-dimensional down view, a three-dimensional down view, and a three-dimensional down sweep view that are available in a side and down scan mode.

19. The marine sonar display device of claim 17, wherein the video view options include a two-dimensional forward view, a two-dimensional forward split view, and a three-dimensional forward sweep view that are available in a forward scan mode.

* * * * *